United States Patent
Hirohata et al.

(10) Patent No.: US 9,389,357 B2
(45) Date of Patent: *Jul. 12, 2016

(54) BACKLIGHT DEVICE

(71) Applicant: JVC KENWOOD Corporation, Yokohama-shi (JP)

(72) Inventors: Naoto Hirohata, Yokohama (JP); Yasuhiro Ueki, Yokohama (JP); Nobuyoshi Yamagishi, Yokohama (JP); Takuya Kakinuma, Yokohama (JP); Mikio Okumura, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 78 days.

This patent is subject to a terminal disclaimer.

(21) Appl. No.: 14/328,555

(22) Filed: Jul. 10, 2014

(65) Prior Publication Data

US 2014/0320785 A1 Oct. 30, 2014

Related U.S. Application Data

(63) Continuation of application No. 14/060,442, filed on Oct. 22, 2013, now Pat. No. 8,807,818, which is a continuation of application No. 13/264,352, filed as application No. PCT/JP2010/002485 on Apr. 5, 2010, now Pat. No. 8,596,850.

(30) Foreign Application Priority Data

Apr. 13, 2009 (JP) ................... 2009-097471

(51) Int. Cl.
*F21V 7/04* (2006.01)
*F21V 8/00* (2006.01)

(52) U.S. Cl.
CPC ............ *G02B 6/0085* (2013.01); *G02B 6/0038* (2013.01); *G02B 6/0068* (2013.01); *G02B 6/0073* (2013.01); *G02B 6/0091* (2013.01)

(58) Field of Classification Search
CPC ............. F21S 8/02; F21S 8/026; F21S 8/028; F21V 21/00; F21V 21/28; F21V 21/046; F21V 21/049; F21V 21/06
USPC ......... 362/147, 148, 368, 362, 269, 287, 372, 362/34, 365
See application file for complete search history.

(56) References Cited

U.S. PATENT DOCUMENTS 6,151,166 A 11/2000 Matsushita et al.
7,600,908 B2 10/2009 Chang et al.
(Continued)

FOREIGN PATENT DOCUMENTS

CN 1846318 A 10/2006
CN 1928653 A 3/2007
(Continued)

OTHER PUBLICATIONS

Notification of Reason(s) for Refusal with the English translation dated Oct. 16, 2012, for Japanese Application No. 2009-097471.
(Continued)

*Primary Examiner* — Ali Alavi
(74) *Attorney, Agent, or Firm* — Venable LLP; Michael A. Sartori; Todd R. Farnsworth

(57) ABSTRACT

A backlight device wherein LEDs which are arranged side by side at a first arrangement interval (P1) are provided to each LED unit. The LED units are mounted to a flexible board at a second arrangement interval. A light guide plate is disposed in such a manner that an end surface thereof is spaced from the LEDs by a distance (H). The light guide plate is disposed so as to satisfy the following relationship: first arrangement interval (P1)<distance (H)<second arrangement interval (P2). Specifically, the LEDs are arranged side by side in such a manner that the first arrangement interval (P1) is not less than 0.1 mm but not greater than 3 mm and the second arrangement interval (P2) is not less than 5 mm but not greater than 15 mm. The light guide plate is disposed in such a manner that the distance (H) is not less than 1 mm but not greater than 7 mm.

13 Claims, 7 Drawing Sheets

(56) References Cited

U.S. PATENT DOCUMENTS

| | | |
|---|---|---|
| 7,661,862 B2 | 2/2010 | Lee et al. |
| 7,661,867 B2 | 2/2010 | Egawa et al. |
| 8,353,614 B2 | 1/2013 | Pan et al. |
| 8,366,308 B2 | 2/2013 | Chiu et al. |
| 8,368,828 B2 | 2/2013 | Jung et al. |
| 8,368,838 B2 | 2/2013 | Kumasaka et al. |
| 8,384,850 B2 | 2/2013 | Kuwajima et al. |
| 8,807,818 B2 * | 8/2014 | Hirohata ............ G02B 6/0038 349/61 |
| 2008/0055534 A1 * | 3/2008 | Kawano ............ G02F 1/133603 349/161 |
| 2009/0279020 A1 | 11/2009 | Tanabe |
| 2010/0283805 A1 | 11/2010 | Nam et al. |

FOREIGN PATENT DOCUMENTS

| | | |
|---|---|---|
| CN | 101197357 A | 6/2008 |
| JP | 2003-532270 A | 10/2003 |
| JP | 2004-079488 A | 3/2004 |
| JP | 2006-039341 A | 2/2006 |
| JP | 2006-134661 A | 5/2006 |
| JP | 2006-302762 | 11/2006 |
| JP | 2007-059168 | 3/2007 |
| JP | 2007-234412 A | 9/2007 |
| JP | 2008-147189 | 6/2008 |
| KR | 10-2007-0101856 | 10/2007 |
| WO | WO-01/84229 A1 | 11/2001 |

OTHER PUBLICATIONS

Office Action in Korean Patent Application No. 10-2011-7026839 dated Jan. 31, 2013.

Office Action in Chinese Patent Application No. 201080016713.7 dated Jul. 19, 2013.

Notice of Decision for Final Rejection in Korean Patent Application No. 10-2011-7026839 dated Jul. 30, 2013.

Office Action in Korean Patent Application No. 10-2011-7026839, dated Oct. 4, 2013.

* cited by examiner

BACKLIGHT DEVICE

CROSS-REFERENCE TO RELATED APPLICATION

This application is a Continuation of U.S. patent application Ser. No. 14/060,442, filed Oct. 22, 2013, which is a Continuation of U.S. patent application Ser. No. 13/264,352, filed Dec. 30, 2011, now U.S. Pat. No. 8,596,850, which is a National Stage Application of International Patent Application No. PCT/JP2010/002485, filed Apr. 5, 2010, and which claims the benefit of Japanese Patent Application No. 2009-097471, filed Apr. 13, 2009, all of which are incorporated herein by reference in their entirety.

TECHNICAL FIELD

The present invention relates to a backlight device and, more particularly, to a backlight device where light is irradiated from the rear surface of the image display panel.

BACKGROUND ART

The development of a flat display utilizing a liquid crystal (LCD) panel, PDP (Plasma Display Panel) and the like are being pursued actively today. In recent years, each manufacturer particularly directs the attention to the further thinning of such a flat display. For example, it is known that a backlight device irradiating light from the rear of a panel is required when a display utilizing the LCD panel is to be manufactured. To promote the thinning of the display, the thinning of the backlight device is also one important subject.

To achieve the thinning of the backlight device, proposed is a backlight system where light is emitted from an LED (Light Emitting Diode) toward an end face of a light guide plate (see Patent Document 1, for instance). Where the LED is placed beside the light guide plate as described above, it is possible to suppress the increase in thickness of the backlight device due to the light source. Also, when a separation distance between an incidence plane of the light guide plate and a light-emitting element is denoted by d and the distance between each light-emitting element is denoted by p, a backlight device meeting $0.2 \leq p \leq d \leq 0.8p$ is proposed (see Patent Document 2, for instance).

RELATED ART DOCUMENTS

Patent Documents

[Patent Document 1] Japanese Unexamined Patent Application Publication (Translation of PCT application) No. 2003-532270.

[Patent Document 2] Japanese Unexamined Patent Application Publication No. 2007-234412.

DISCLOSURE OF INVENTION

Problems to be Solved by the Invention

However, since LED is a point light source, a plurality of LEDs need to be arranged along the end face of the light guide plate. In this case, the non-uniformity of luminous intensity caused by the placement interval of the LEDs must be suppressed. Further, making the size of the display larger is being pursued together with the thinning. This requires an increase in the amount of light emitted from the entire backlight. As described above, when light is to be emitted toward the end face of the light guide plate, many of the LEDs must be arranged around the end face of the light guide plate. However, for example, when two or more LEDs are to be grouped and then assembled to facilitate the assembly, LEDs placed side by side around one end face of the light guide plate may all not be equally spaced. In such a case, the non-uniformity of luminous intensity caused by placement intervals needs to be suppressed as well.

The present invention has been made to solve problems as described above, and a purpose thereof is to suppress the non-uniformity of luminous intensity caused by the placement interval of LEDs in a backlight device having a plurality of LEDs emitting light to an end face of a light guide plate.

Means for Solving the Problem

To resolve the above-described problems, a backlight device according to one embodiment of the present invention includes: a light guide plate; and a plurality of white light-emitting diodes, placed side by side in a direction extending along an end face of the light guide plate, the plurality of white light-emitting diodes being spaced apart from the end face of the light guide plate by a distance H. The plurality of white light-emitting diodes are constituted of a group of two or more white light-emitting diodes, and are placed side by side such that a placement interval between each white light-emitting diode in the group is P1, and a placement interval between each group is P2, and the light guide plate is so arranged as to meet a condition that $P1 \leq H \leq P2$.

Advantageous Effects

The present invention suppresses the luminance non-uniformity caused by the placement interval of LEDs in the backlight device having a plurality of LEDs emitting light on the end face of the light guide plate.

BEST MODE FOR CARRYING OUT THE INVENTION

Hereinafter, the present invention will be described in detail based on preferred embodiments with reference to the accompanying drawings.

First Embodiment

Figure 1:
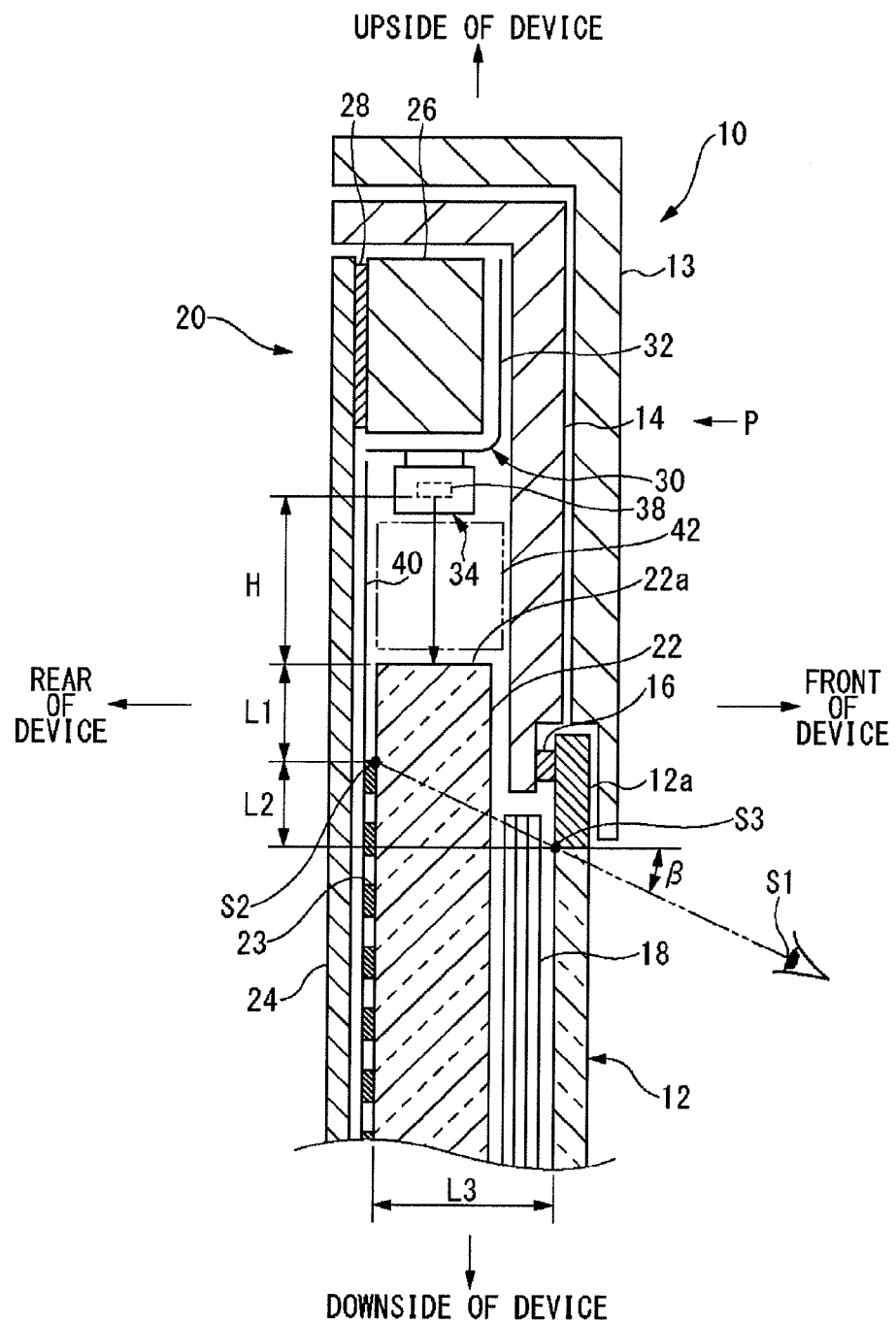
FIG. 1 is a cross-sectional view of an image display apparatus according to a first embodiment.

FIG. 1 is a cross-sectional view of an image display apparatus 10 according to a first embodiment. FIG. 1 is a cross-section of an upper portion of the image display apparatus 10 cut along a plane vertical to the horizontal direction of the image display apparatus 10. The image display apparatus 10 includes a liquid crystal panel 12, a front cover 13, a chassis 14, a cushion 16, an optical sheet 18, and a backlight device 20.

The crystal display panel 12 is formed in a rectangular plate-like shape. A light shielding section 12a is provided on a rim of the liquid crystal panel 12. The chassis 14 has a cross-section which is so shaped that the letter L is rotated by 180 degrees, and has a length in the horizontal direction which is slightly longer than the liquid crystal panel 12. The chassis 14 is so arranged as to cover a front of device and an upside of device above the liquid crystal panel 12. The cushion 16 is provided under the front of the chassis 14, and the light shielding section 12a located on an upper side of the liquid crystal panel 12 is interposed between the cushion 16 and the front cover 13. Also, the rear surface of the chassis 14 is subjected to the surface treatment in white color to have a higher light reflectance.

The backlight device 20 is installed in a rearward side of the liquid crystal panel 12 and the chassis 14. The backlight device 20 includes a light guide plate 22, a rear plate 24, a heatsink 26, a heat radiation sheet 28, a base plate unit 30, and a reflection sheet 40. Similarly, a heatsink 26, a heat radiation sheet 28, and a base plate unit 30 are also provided in a lower side of the backlight device 20. Hereinafter, the components only in the upper portion of the backlight device 20 are described, and the description of the heatsink 26, the heat radiation sheet 28 and the base plate unit 30 provided in the lower side thereof is omitted. The placement positions of the heatsink 26, the heat radiation sheet 28 and the base plate unit 30 are not limited to the upside of device and the downside of device of the light guide plate 22. For example, the heatsink 26, the heat radiation sheet 28 and the base plate unit 30 may be placed on the right side and the left side of the light guide plate 22 as viewed from the front of the image display apparatus 10.

The light guide plate 22 is formed of a plate-like member and sized slightly larger than the liquid crystal panel 12. In the second embodiment, the light guide plate 22 is formed of acrylic and the thickness of the light guide plate 22 is 2 mm. Note that the light guide plate 22 may be formed of other materials such as polycarbonate. Though the thickness of the light guide plate 22 is not limited to this value, the thickness thereof is set to a value ranging from 1 mm to 5 mm in order to make the entire image display apparatus 10 thinner. The light guide plate 22 is arranged in the rearward side of the liquid crystal panel 12 in such a manner as to cover the entire rear surface side of the liquid crystal panel 12. Further, a dot-pattern 23 is formed on a surface opposite to the liquid crystal panel 12 of the light guide plate 22, and the dot-pattern 23 functions to radiate the light incident from an end face 22a of the light guide plate 22, to the liquid crystal panel 12. The optical sheet 18 is formed such that a diffusion sheet, a prism sheet and a polarization separation sheet are stacked on each other. The optical sheet 18 is arranged between the liquid crystal panel 12 and the light guide plate 22.

The rear plate 24 is formed of a sheet metal having an outer shape of rectangle larger in size than the light guide plate 22. The rear plate 24 is arranged farther on a rearward side than the light guide plate 22. The reflection sheet 40, which is formed in a rectangular shape larger in size than the light guide plate 22, is arranged between the light guide plate 22 and the rear plate 24.

The base plate unit 30 has a flexible substrate 32 and LED units 34. The flexible substrate 32 is a base plate, having a general flexibility, which is formed such that polyimide film is used as an insulator and copper foil is used as a conductor. Also, the flexible substrate 32 has an overall length similar to that of the light guide plate 22 in the horizontal direction of device. The flexible substrate 32 is formed such that the shape thereof is bent into an L-shape. A plurality of LED units 34 are bonded to an outer surface of the flexible substrate 32. Each LED unit 34 is provided with an LED 38.

A white light-emitting diode that radiates white light is used as the LED 38. More specifically, the LED 38 is structured such that a phosphor layer, which radiates yellow light when excited by blue light, is stacked on a light-emitting face of a semiconductor device emitting blue light. Thereby, white light which is the synthesized light of blue light and yellow light radiates from the LED 38. It is appreciated here that the LED 38 may be structured such that a first phosphor layer, which radiates red light when excited by blue light, and a second phosphor layer, which radiates green light when excited by blue light, are stacked on the light-emitting face of a semiconductor device emitting blue light. By employing this modification, white light which is the synthesized light of blue light, red light and green light can be obtained as well. To protect the LED 38 from the exterior environment, the LED unit 34 is sealed with a sealing material of optically low load such as synthetic resin which is highly transparent in a visible range.

The flexible substrate 32 is arranged above the light guide plate 22 such that the LED 38 is spaced apart from the end face 22a of the light guide plate by a distance H. Here, the distance H is a distance between the LED 38 and the end face 22a in a direction vertical to the end face 22a of the light guide plate 22. A light mixing chamber 42 is formed in a space surrounded by the end face 22a of the light guide plate 22, the chassis 14 and the reflection sheet 40. The light mixing chamber 42 functions to have light emitted from the LED 38 enter the end face 22a of the light guide plate 22 while mitigating the luminance non-uniformity. The light emitted from the LED 38 passes through the light mixing chamber 42 and then directly enters the end face 22a of the light guide plate 22 or enters the end face 22a of the light guide plate 22 after having been reflected by an inner surface of the chassis 14 or the reflection sheet 40. The light that has entered inside the light guide plate 22 from the end face 22a is then diffusely reflected and irradiated to the rear surface of the liquid crystal panel 12 through the optical sheet 18 as uniform light. At this time, the rear surface of the light guide plate 22 is subjected to a processing treatment so that light emitted from the LED 38 can be irradiated toward the liquid crystal panel 12 at as close a vertical angle as possible.

The heatsink 26 is formed in a block-like shape and formed of a highly heat-radiant material such as aluminum. Also, the heatsink 26 is arranged such that the heatsink 26 adheres tightly to the inner surface of the flexible substrate 32 to allow the heat generated by the LED 38 to be released. The adhesion is maintained by the heat radiation sheet, silicon paste and the like. The heatsink 26 is fixed in front of the rear plate 24 via the heat radiation sheet 28. The heatsink 26 and the heat radiation sheet 28 are thermally connected to each other with the silicon paste applied therebetween. Though the flexible substrate 32 is used in the first embodiment, this should not be considered as limiting and, for example, a metal-based substrate may be employed.

The light shielding section 12a of the liquid crystal panel 12 is so provided as to cover an end face of the light guide plate 22 in front thereof. The light shielding section 12a is so provided that the end face 22a is not seen from a user's virtual viewpoint S1 because the end face 22a is blocked by the light shielding section 12a. The virtual viewpoint S1 is a position assumed as an eye position when a user is to view an image displayed on the image display apparatus 10, and the virtual viewpoint S1 is so determined as to lie within a predetermined range.

The virtual viewpoint S1 of the image display apparatus 10 as described above needs to cover exhaustively all ranges of the display of the image display apparatus 10 viewed by the user. The position assume as a user's eye position needs to not only include the front position of the image display apparatus 10 but also consider the case where a predetermined angle is formed from the front position of the image display apparatus 10. For example, when the image display apparatus 10 is viewed in the vertical direction, there are cases where a panel hanged from a ceiling or hanged on a wall is viewed from down below. Similarly, when the image display apparatus 10 is viewed in the horizontal direction, there are cases where it is viewed in an angled horizontal direction.

Further, the boundary in the rearward side of the light shielding section 12a is defined to be a light shielding boundary S3. A rim in a range visible from the virtual viewpoint S1 in the rear surface of the light guide plate 22, namely a spot that overlaps with the light shielding boundary S3 as viewed from the virtual viewpoint S1 is defined to be a visible boundary S2.

Figure 2:
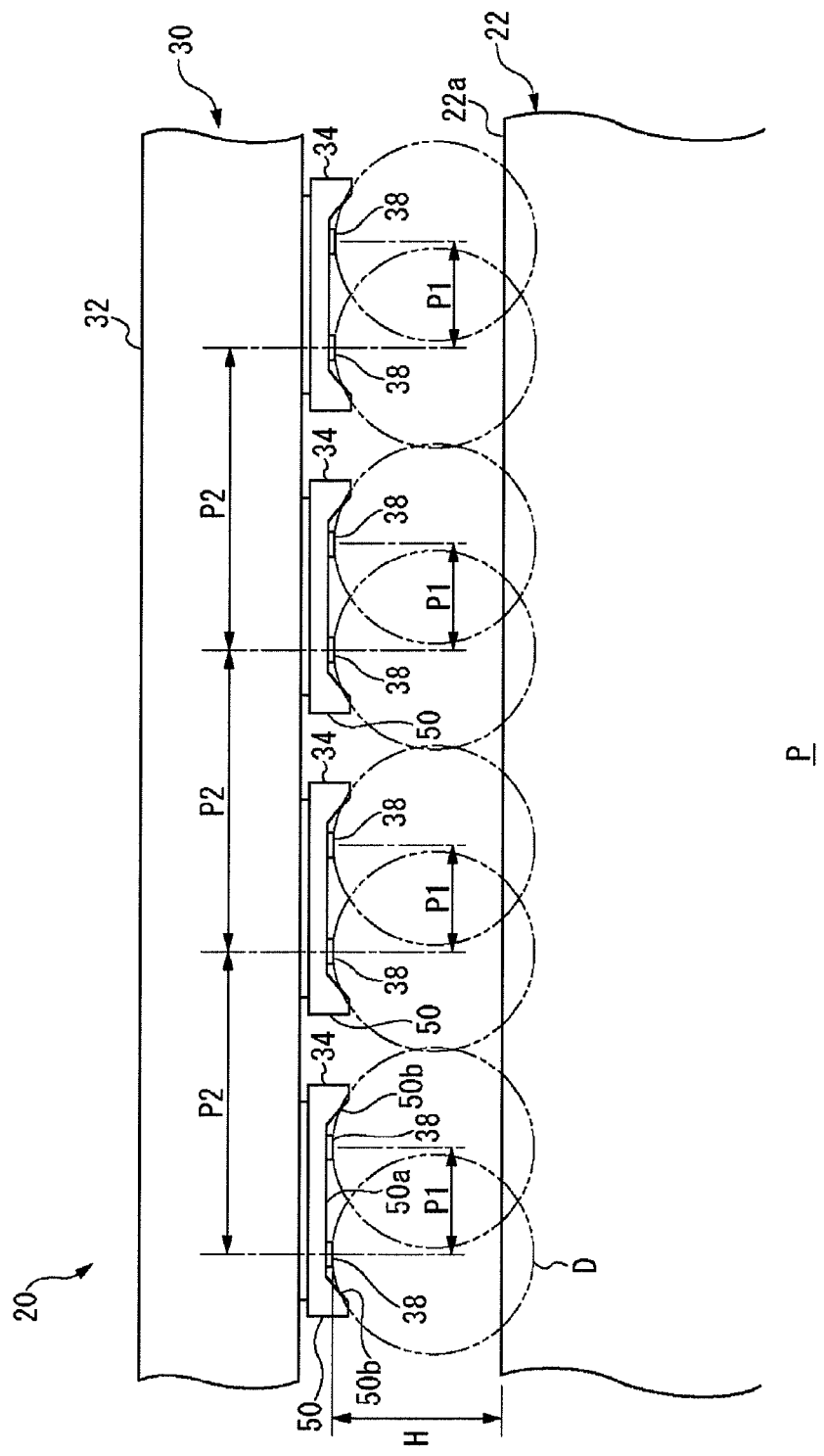
FIG. 2 is a diagram showing a backlight device according to a first embodiment as viewed from a viewpoint P of FIG. 1.

FIG. 2 is a diagram showing the backlight device 20 according to the first embodiment as viewed from the viewpoint P of FIG. 1. Each LED unit 34 has a package 50 and two LEDs 38. The package 50 is formed of a highly heat-radiant ceramics, and the outer shape of the package 50 is formed in a rectangular plate-like shape. The package 50 is formed such that both ends of the package 50 in a longitudinal direction are raised and a center part thereof is recessed (recessed part). A bottom 50a of a recessed part is flat. The two LEDs 38 are placed side by side in the longitudinal direction along the bottom 50a at an interval of a first placement interval P1.

An inclined portion 50b is provided in each of the both ends in the longitudinal direction in order that light radiating from side surfaces of the LED 38 can also be utilized efficiently. The height of the inclined portion 50b is greater than that of the LED 38. Further, the surface of the package 50 is formed such that the surface thereof has a higher reflectance. Provision of the inclined portions 50b as described above allows the light emitted from the LED 38 to enter at an angle closer to the direction vertical to the end face 22a. Conversely, the inclined portions 50b blocks the light which radiates from the LED 38 and travels at a large angle from the direction vertical to the light guide plate 22.

In this manner, two LEDs 38 provided in each LED unit 34 are integrally structured with each other. Note that the number of LEDs 38 provided in each LED unit 34 is not limited to two and, for example, three or more LEDs 38, such as three, four, six, or eight of them, may be provided. In such a case, too, a plurality of LEDs 38 provided in the same LED unit 34 are placed side by side at equal intervals of the first placement interval P1.

In the base plate unit 30, a plurality of LED units 34 are placed side by side at equal placement intervals of P2 in a direction extending along the end face 22a of the light guide plate 22. Here, another embodiment is conceivable where in order to increase the amount of light incident on the light guide plate 22, the plurality of LED units 34 are placed side by side such that the direction extending along the end face 22a forms a right angle relative to a direction in which the LEDs 38 in each LED unit 34 are placed side by side. However, in the first embodiment, a thin light guide 22 is used for the purpose of making the image display apparatus 10 thinner.

Accordingly, if the LEDs 38 are arranged according to the above conceivable embodiment, it will be difficult to have the light emitted from the LEDs 38 enter the end face 22a properly.

Accordingly, in the first embodiment, a plurality of LED units 34 are arranged such that the LEDs 38 are aligned linearly in a direction extending along the end face 22a. In the first embodiment, the first placement interval P1 is 0.6 mm, whereas the second placement interval P2 is 10 mm.

It goes without saying that the first placement interval P1 and the second placement interval P2 are not limited to the above-mentioned values. The first placement interval P1 must be 0.1 mm or above in order that the LEDs 38 do not overlap in a pitch direction. Also, for each ceramic package, the packaging cost can be reduced if it can be mounted on a substrate using an automatic machine. In this manner, when the ceramic package is to be mounted using the automatic machine, the first placement interval P1 needs to be 3 mm or below and is preferably 2 mm. Thus, the first placement interval P1 may be a value between 0.1 mm (inclusive) and 3 mm (inclusive). Also, the second placement interval P2 may be a value between 5 mm (inclusive) and 15 mm (inclusive).

Each LED unit 34 is provided with an anode electrode and a cathode electrode. A pair of these electrodes is used as a common electrode, and a voltage is applied across these electrodes and thereby both the two LEDs 38 in each LED unit 34 light up. The two LEDs 38 are connected in parallel with each other, and protection elements for protecting the LEDs 38 from excess voltage are also connected in parallel with each other.

Where a thin light guide plate 22 is employed, it is difficult to place the LEDs 38 side by side vertical to a direction extending along the light guide plate 22, as described previously. For this reason, a countermeasure may be conceivable where a plurality of LEDs 38 are arranged by making the placement intervals of the LEDs 38 smaller in order to avoid the insufficient amount of light incident on the light guide plate 22. However, where the electrodes are provided for each LED 38, the assembly work necessary for the mounting of the LED 38 may be cumbersome and complicated, so that it may be difficult to suppress the number of steps required for the manufacturing of the image display apparatus 10. In this manner, a plurality of LEDs 38 are provided in each LED unit 34 and then the LED unit 34 is mounted on the flexible substrate 32. Thus, a plurality of LEDs 38 can be mounted integrally. Accordingly, the installation job of the LEDs 38 can be done with ease and therefore the manufacturing process of the image display apparatus 10 can be simplified.

It goes without saying that the preferred embodiments of the present embodiment are not limited to a case where a plurality of LEDs 38 are integrally configured as described above and, for example, a pair of electrodes to which a voltage is applied when the LEDs 38 light up may be provided in each of the LEDs 38. Also, an arrangement may be as follows. That is, a plurality of LEDs 38 are not configured integrally, and the placement interval of LEDs 38 in a group constituted by two or more LEDs 38 may be the first placement interval P1, whereas the placement interval between each of such groups may be the second placement interval P2.

The "group" defined herein is a group constituted by a plurality of LEDs arranged at equal intervals of the first placement interval P1. The number of LEDs contained in each group is not limited to two and, for example, it may be three or more LEDs, such as three, four, six, or eight of LEDs. In this case, a plurality of LEDs 38 may be arranged such that N×[first placement interval P1]<[second placement interval P2], where N indicates the number of LEDs included in each group.

The LED 38 functions as a point light source. The distribution D of light emitted from each LED 38 is known to be circular as shown in FIG. 2. Thus, there is a possibility that the light incident on the end face 22a of the light guide plate 22 may suffer the non-uniformity of luminous intensity attributable to the placement intervals of the LED 38. In the first embodiment, a difference between the maximum value and the minimum value of the luminous intensity in the end face 22a of the light guide plate 22 is defined to be the "luminance non-uniformity". In the luminous intensity distribution of light radiated from the LED unit 34 according to the first embodiment, the luminous intensity distribution component in a direction parallel to the end face 22a of the light guide plate 22 is stronger than the luminous intensity distribution component in a direction vertical to the end face 22a thereof. Such luminous intensity distributions as those may be a factor that increases the non-uniformity of luminous intensity.

Since the luminous intensity distribution D of the LED 38 is as described above, the luminance non-uniformity increases or decreases as the distance H is varied. In general, as the spacing between the LEDs and the light guide plate becomes shorter, the decrease of luminous intensity between the LEDs becomes severer and the non-uniformity of luminous intensity becomes larger. On the other hand, as the spacing between the LEDs and the light guide plate becomes longer and larger, the luminance non-uniformity becomes smaller but the average luminous intensity of light incident on the end face of the light guide plate drops due to the diffusion and absorption of light in the light mixing chamber 42. Thus, the distance H needs to be set so that the luminance non-uniformity in the end face 22a of the light guide plate 22 and the average luminous intensity of light incident on the end face 22a of the light guide plate 22 meet the respective required values.

If the LEDs 38 are all placed side by side at equal intervals, the distance H that becomes minimum while the distance H is varied can be used. However, in the first embodiment, a plurality of LEDs 38 are such that the placement interval between two LEDs provided in each LED unit 34 is the first placement interval P1, and the placement interval between adjacent LED units 34 is the second placement interval P2. Accordingly, decrease or increase in the luminance non-uniformity is further caused depending on the first placement interval P1 and the second placement interval P2. As a result of research and development, it has been revealed that the degradation of the incident light efficiency of light incident on the end face 22a of the light guide plate 22 can be suppressed and, at the same time, the luminance non-uniformity of light incident on the end face 22 thereof can be appropriately suppressed when the light guide plate 22 is so arranged as to meet a condition that P1≤H≤P2.

Figure 3:
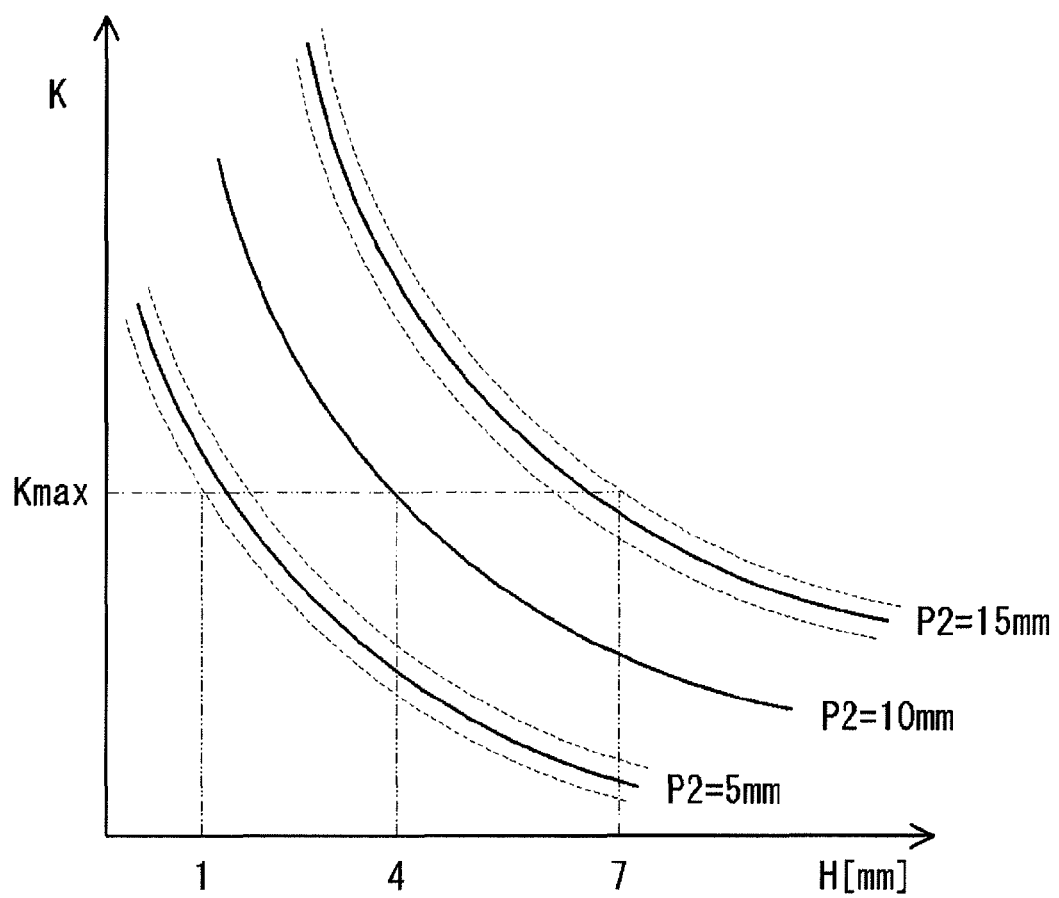
FIG. 3 is a graph showing a relation between a distance H and a non-uniformity of luminous intensity K on an end face of a light guide plate in a backlight device according to a first embodiment.

FIG. 3 is a graph showing a relation between the distance H and the non-uniformity of luminous intensity K on the end face 22a of the light guide plate 22 in the backlight device 20 according to the first embodiment. FIG. 3 shows the relations between the distance H and the non-uniformity of luminous intensity K when the second placement interval P2 is 5 mm, 10 mm, and 15 mm, respectively. In such cases, the dotted lines for the second placement interval P2 of 5 mm and 15 mm indicate non-uniformity widths when the first placement interval P1 is varied in a range of 0.1 mm to 3 mm. FIG. 3 indicates that the non-uniformity of luminous intensity K increases as the second placement interval P2 increases.

A permissible luminance non-uniformity level Kmax is a limit value of the luminance non-uniformity of light incident on the end face 22a of the light guide plate 22 to meet the required quality of the image display apparatus 10. Since the second placement interval P2 is 10 mm in the first embodiment, the distance H is set to 4 mm which is a minimum value with which the non-uniformity of luminous intensity K becomes less than or equal to the permissible luminance non-uniformity level Kmax. As can be seen from FIG. 3, when a plurality of LEDs 38 are so arranged as to meet the condition that the first placement interval P1 ranges from 0.1 mm to 3 mm and the second placement interval P2 ranges from 5 mm to 15 mm, the distance H needs to be in a range of 1 mm to 7 mm to suppress the non-uniformity of luminous intensity K at or below the permissible luminance non-uniformity level Kmax. Thus, the light guide plate 22 is so arranged that the distance H ranges from 1 mm to 7 mm.

According to a preferred exemplary embodiment, the first placement interval P1 is 0.5 mm, the second placement interval P2 is 5 mm, and the distance H is 1.5 mm. According to another preferred exemplary embodiment, the first placement interval P1 is 0.6 mm, the second placement interval P2 is 8 mm, and the distance H is 3 mm. According to still another preferred exemplary embodiment, the first placement interval P1 is 0.7 mm, the second placement interval P2 is 10 mm, and the distance H is 4 mm.

Note that two LEDs 38 are mounted on each LED unit 34 and are so arranged as to meet a condition that 2×[first placement interval P1]<[second placement interval P2]. In this case, the first placement interval P1, the second placement interval P2 and the distance H are so set as to meet a condition that 1≤H≤P2/2. In such a case, it is desirable that the first placement interval P1 ranges from 0.1 to 2 mm, the distance H from 1 mm to 5 mm, and the second placement interval P2 from 5 mm to 11 mm.

Figure 4:
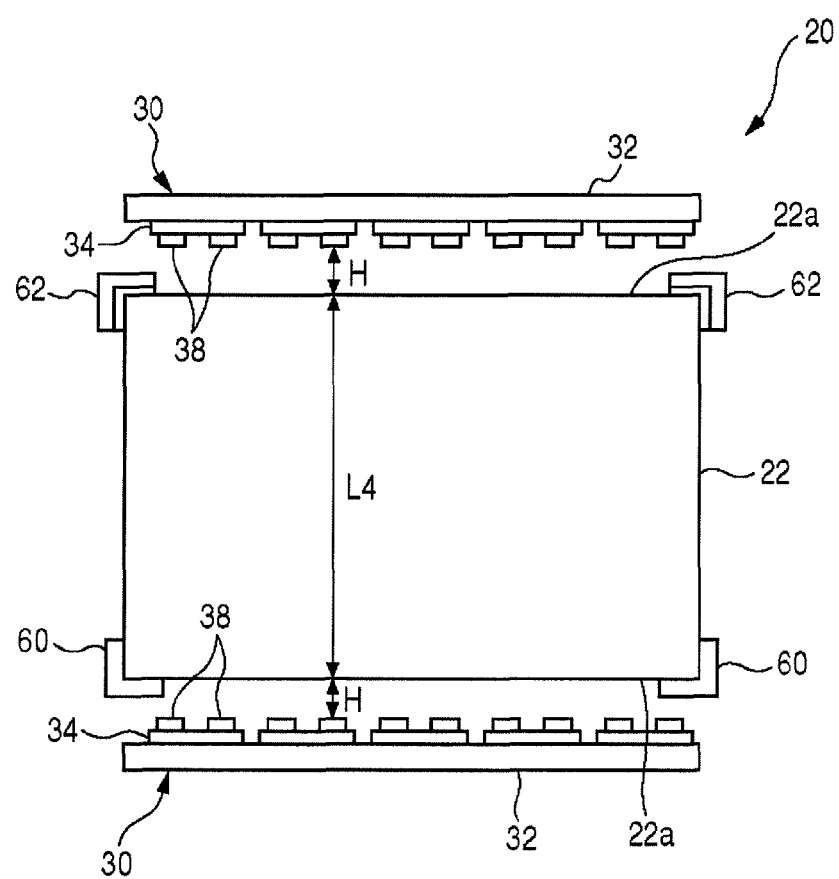
FIG. 4 is an illustration schematically showing a front view of a backlight device according to a first embodiment.

FIG. 4 is an illustration schematically showing a front view of the backlight device 20 according to the first embodiment. The light guide plate 22 is supported in lower two corners thereof by first supporting member 60 and supported in upper two corners by second supporting members 62. As shown in FIG. 4, the base plate units 30 are provided such that the LEDs 38 are disposed counter to the end face 22a at the upper side of the light guide plate 22 and are disposed counter to the end face 22a at the lower side thereof, respectively. Also, the light guide plate 22 is positioned by butting it against the first supporting members 60 by gravity. Thus, if height L4 of the light guide plate 22 (hereinafter referred to as "light guide plate height L4" also) expands or contracts due to changes in temperature of installation environment, the distance H between the lower-side end face 22a and the LEDs 38 will vary little but the distance H between the upper-side end face 22a and the LED 38 will vary relatively greatly.

Now, refer back to FIG. 1. As the light guide plate 22 contracts due to a drop in the ambient temperature as described above, the distance H becomes large. Nevertheless, as the distance H becomes excessively large, the end face 22a of the light guide plate 22 reaches the visible boundary S2 and thereby the end face 22a of the light guide plate 22 may be visible from the virtual viewpoint S1. When the user views the liquid crystal panel 12 from the front of the image display apparatus 10, the end face 22a of the light guide plate 22 is viewed as being brightly illuminated through the periphery of the light shielding boundary S3. As a result, the periphery thereof appears dark, which may give a sense of discomfort to the user.

For this reason, the light guide plate 22 according to the first embodiment is so installed that the end face 22a of the light guide plate 22 is shielded by the light shielding section 12a and is therefore not seen from the user's virtual viewpoint S1, even when the light guide plate 22 contracts due to changes in temperature within the assumed ambient temperature range. In actual setting, the line connecting the virtual viewpoint S1 and the visual boundary S2 does not become a straight line but it is assumed herein that the virtual viewpoint S1 and the visual boundary S2 can be connected by a straight line. Suppose, for example, that an angle relative to the horizontal line of a line-of-sight that views the light shielding boundary S3 from the virtual viewpoint S1 is denoted β and a distance from the light shielding boundary S3 to the rear surface of the light guide plate 22 is denoted L3. Then, the visual boundary S2 is located in a position higher than the light shielding boundary S3 by L2 which is equal to L3×tan β.

For the image display apparatus 10, a standard ambient temperature Ts which is considered normal in the assumed environment where the device is installed is set to 25 degrees. The light guide plate 22 is so provided that the distance between the end face 22a of the light guide plate 22 and the visual boundary S2 under the standard ambient temperature Ts is a margin L1. Also, for the image display apparatus 10, an assumed ambient temperature which indicates a range of temperatures assumed in the installation environment is set in advance. This assumed ambient temperature is a temperature between a minimum ambient temperature Tmin and a maximum ambient temperature Tmax. In the first embodiment, the margin L1 is set such that L1 is longer than the length corresponding to an amount of contraction observed when the ambient temperature drops from the standard ambient temperature Ts to the minimum ambient temperature Tmin. Setting the margin L1 as described above prevents the end face 22a from reaching the visible boundary S2 in the event that the temperature reaches the minimum ambient temperature Tmin.

Also, as the distance H becomes smaller as described above, the luminance non-uniformity of light incident on the end face 22a may increase. Also, the light guide plate 22 is so provided that the distance H is not shorter than a minimum distance Hmin at which the luminance non-uniformity attributable to the placement intervals in a plurality of LEDs 38 is a permissible value, even when the light guide plate 22 expands due to changes in temperature within the assumed ambient temperature range. More specifically, the light guide plate 22 is so provided as to meet a condition that [first placement interval P1]≤[distance H]≤[second placement interval P2] even when the light guide plate 22 expands or contracts due to changes in temperature within the assumed ambient temperature range.

Figure 5:
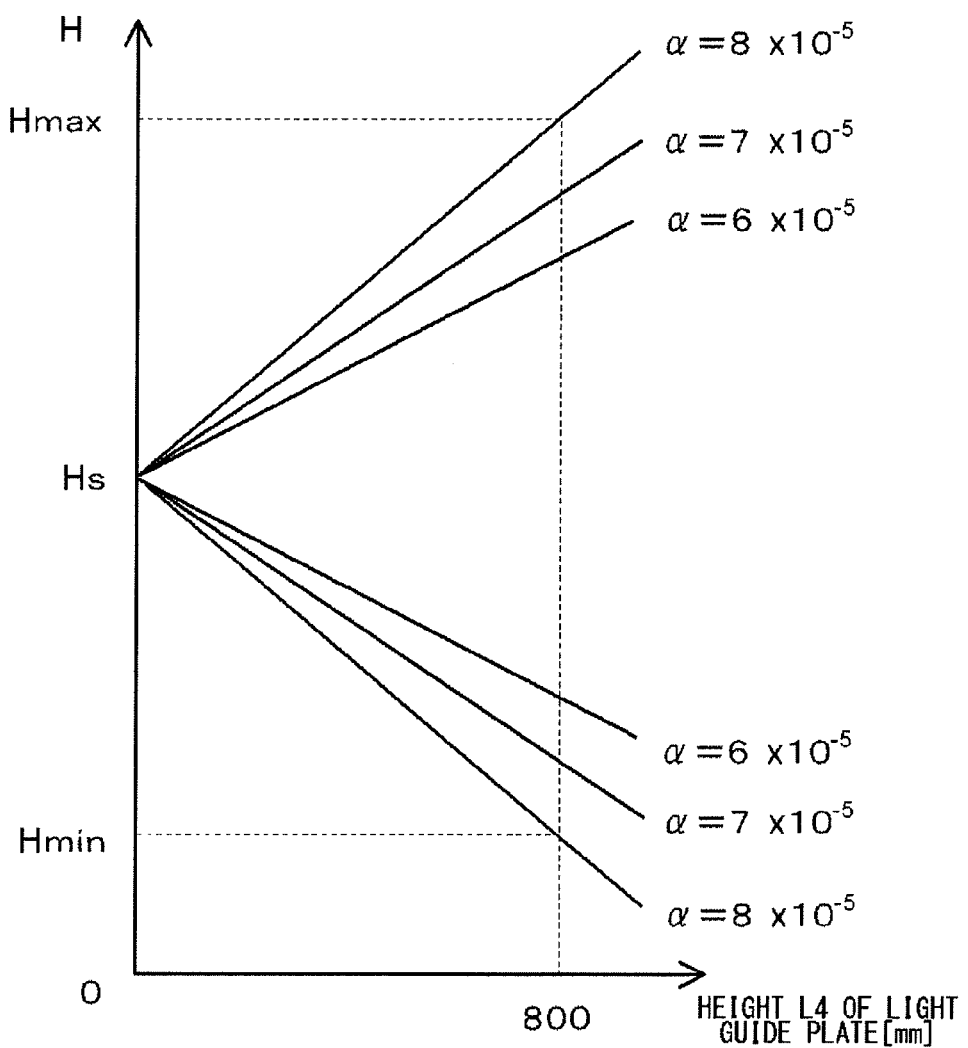
FIG. 5 is a graph showing a relation between a light guide plate height L4 and a distance H in a backlight device according to a first embodiment.

FIG. 5 is a graph showing a relation between the light guide plate height L4 and the distance H in the backlight device 20 according to the first embodiment. In FIG. 5, increasing straight lines indicate a relation between the light guide height L4 and the interval H at the time the ambient temperature becomes the minimum ambient temperature Tmin. In FIG. 5, decreasing straight lines indicate a relation between the light guide height L4 and the interval H at the time the ambient temperature becomes the maximum ambient temperature Tmax. In FIG. 5, the distance at the standard ambient temperature Ts is defined and denoted as Hs. A linear expansion coefficient α of material that may, for instance, constitute the light guide plate 22 is as follows.

Acrylic: α=7 to $8 \times 10^{-5}$ [/° C.]
Polycarbonate: α=6 to $7 \times 10^{-5}$ [/° C.]

Thus, the linear expansion coefficient α of the light guide plate 22 is in a range of $6 \times 10^{-5}$ to $8 \times 10^{-5}$. FIG. 5 shows a relation between the light guide height L4 and the distance H, about three kinds of light guide plates 22 whose linear expansion coefficient α are $6 \times 10^{-5}$, $7 \times 10^{-5}$, and $8 \times 10^{-5}$.

In FIG. 5, a maximum distance Hmax is the maximum value of distances H at which the incident light efficiency of light incident on the end face 22a of the light guide plate 22 from the LEDs 38 is a permitted value. In this manner, the light guide plate 22 is so provided that the distance H is not greater than the maximum distance Hmax at which the incident light efficiency of light incident on the end face 22a of the light guide plate 22 from a plurality of LEDs 38 is a permitted value, even when the light guide plate 22 contracts due to changes in temperature within the assumed ambient temperature range.

A minimum distance Hmin is the minimum value of distances H at which the luminance non-uniformity of light incident on the end face 22a of the light guide plate 22 from the LEDs 38 is a permitted value. As described above, the minimum distance Hmin is the minimum value that meets a condition that [first placement interval P1]≤[distance H]. Since the value of the minimum distance Hmin becomes the first placement interval P1, the distance H is identical to the first placement interval in the case of the first embodiment.

FIG. 5 indicates that in order not to exceed the maximum distance Hmax in all ranges of the aforementioned linear expansion coefficients α in the event that the distance H increases due to a contraction of the light guide plate 22, the light guide plate height L4 needs to be 800 mm or below. Also, in order not to fall below the minimum distance Hmin in all ranges of the aforementioned linear expansion coefficients α in the event that the distance H decreases due to an expansion of the light guide plate 22, the light guide plate height L4 needs similarly to be 800 mm or below.

Even when the light guide plate 22 contracts maximally due to changes in temperature within the assumed ambient temperature range, the maximum interval Hmax in FIG. 5 may be the maximum value of the distances H at which the end face 22a of the light guide plate 22 is shielded by the light shielding section 12a of the liquid crystal panel 12 and is therefore not seen from the user's virtual viewpoint S1. In this case, the sum of the distance H and the margin L1 at the standard ambient temperature Ts needs to be the maximum distance Hmax or below.

Figure 6:
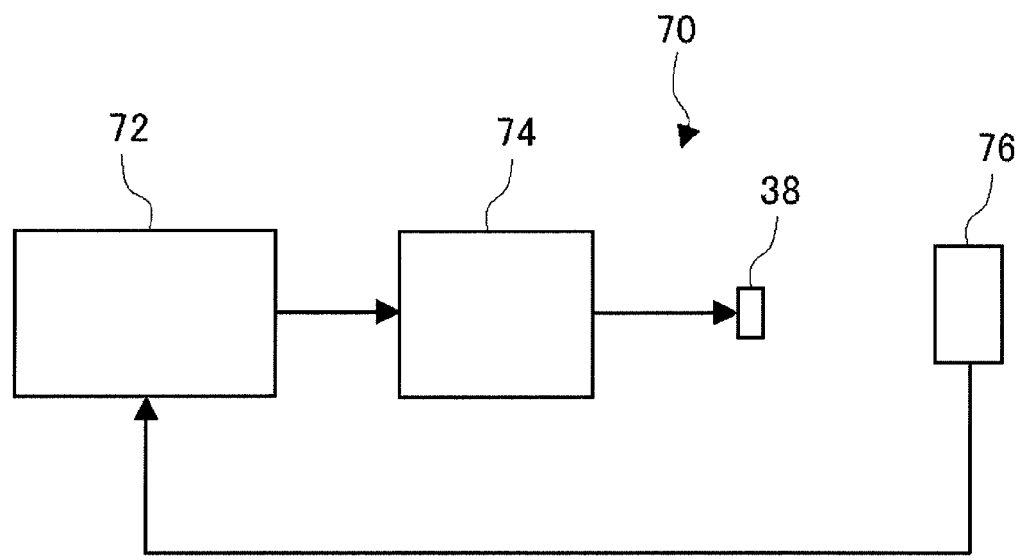
FIG. 6 is a block diagram schematically showing a configuration of a lighting control system provided in an image display apparatus according to a first embodiment.
Figure 7:
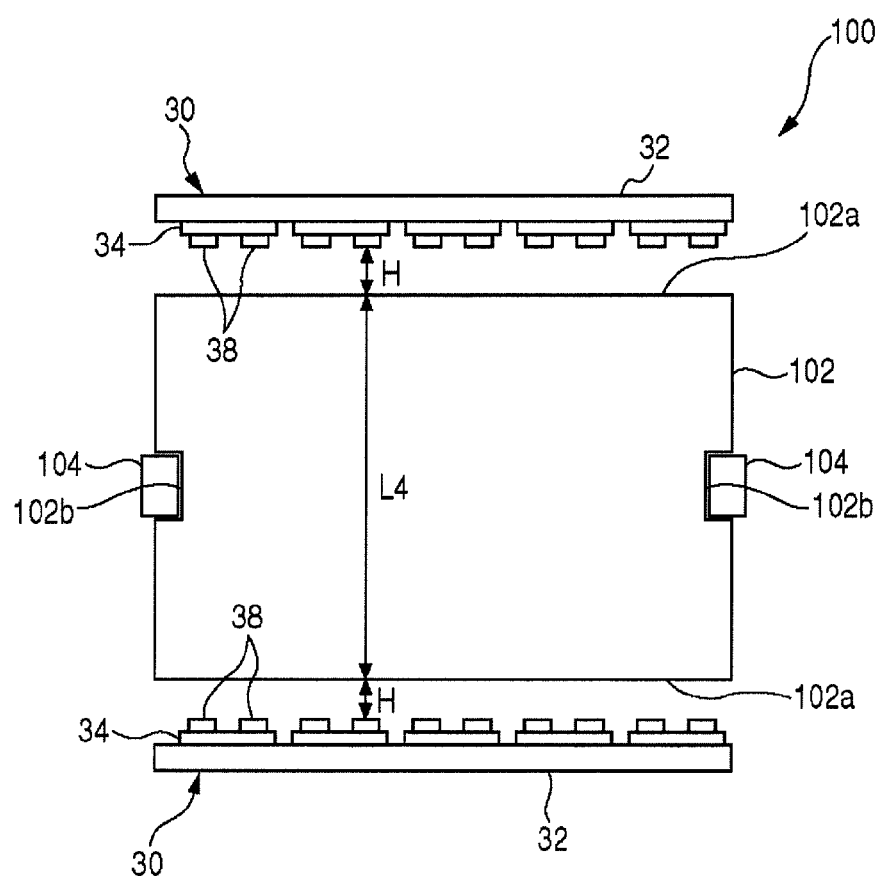
FIG. 7 is an illustration schematically showing a front view of a backlight device according to a second embodiment.

FIG. 6 is a block diagram schematically showing a configuration of a lighting control system 70 provided in the backlight device 20 according to the first embodiment. The lighting control system 70 includes an LED drive control circuit 72, and LED drive circuit 74, an LED 38, and a temperature sensor 76. The temperature sensor 76 is provided inside the image display apparatus 10, and the temperature sensor 76 detects the ambient temperature around the light guide plate 22. The temperature sensor 76 is connected to the LED drive control circuit 72, which reads a detection result of the temperature sensor 76 for every predetermined time interval. The LED drive control circuit 72 sends a control signal to the LED drive circuit 74, which supplies a drive current corresponding to the received control signal, to the LED 38.

For example, suppose that the standard ambient temperature Ts is 25° C., the maximum ambient temperature Tmax is 500° C., the light guide plate 22 is formed of acrylic whose linear expansion coefficient α is $8 \times 10^{-5}$, and the light guide plate height L4 is 400 mm. Then, the distance H contracts by 0.8 mm which is equal to $400 \times 25 \times (8 \times 10^{-5})$ after the ambient temperature has reached the maximum ambient temperature Tmax. If the distance H is 4.8 mm at the standard ambient temperature Ts, the distance H will be 4.0 mm at the maximum ambient temperature Tmax. As the distance H becomes smaller as described above, the incident light efficiency of light incident on the light guide plate 22 increases. The lighting control system 70 controls the power to be supplied to the LED 38 to suppress the non-uniformity in the luminance of light, irradiated to the liquid crystal panel 12 from the backlight device 20, caused by such changes of the light incident efficiency.

More specifically, the LED drive control circuit 72 controls the power supplied to the LED 38 in the following manner. That is, as the ambient temperature around the light guide plate detected by the temperature sensor 76 increases, the drive current supplied to the LED 38 is decreased; as the ambient temperature around the light guide plate 22 drops, the drive current supplied to the LED 38 is increased. For example, when the temperature rises by x % relative to the standard ambient temperature Ts, the drive current supplied to the LED 38 is reduced by a×x % where "a" is a constant. Conversely, when the temperature drops by x % relative to the standard ambient temperature Ts, the drive current supplied to the LED 38 is increased by a×x %. As a result, the LED 38 can be lit efficiently. Thus the power consumed by the LED 38 can be reduced and the amount of heat generated by the LED 38 can be suppressed.

Note that the output value of the temperature sensor such as a thermistor varies logarithmically in relation to changes in temperature. Accordingly, the LED drive control circuit 72 may store a table that defines a correspondence relation between the output values of the temperature sensor 76 and the drive current to be supplied to the LED 38. The LED drive control circuit 72, when it has read the output value of the temperature sensor 76, may determine the drive current to be supplied to the LED by referencing the table.

The light guide plate 102 has rectangular grooves 102b approximately in the centers of left-hand-side and right-hand-side end faces of the light guide plate 102. The rear plate 24 is fixed to two supporting members 104. The outer shape of each supporting member 104 is a rectangle and has a height slightly smaller than the depth of the groove 102b. The light guide plate 102 is so arranged that the supporting member 104 is inserted in the groove 102b. In this manner, the light guide plate 102 is positioned by the supporting members 104 approximately in the center along the direction of the light guide plate height L4. Note that the outer shape of the grooves 102 and the supporting members 104 is not limited to the rectangle.

As described above, the light guide plate 102 is positioned approximately in the centers along the height direction. Thus, the non-uniformity in one of the distances H in the vertical direction can be suppressed by about half as compared with the case where one of the end faces in the vertical direction is positioned as in the first embodiment, for instance. Note that the height at which the light guide plate 102 is positioned is not limited to an approximately central position along the height direction and, for example, the light guide plate 102 may be positioned in any other midway position or any other arbitrary position of left-hand-side and right-hand-side end faces of the light guide plate 102.

The present invention is not limited to the above-described embodiments only, and any combination of the above-described structural components as appropriate is effective as and encompassed by the present embodiments. Also, it is understood by those skilled in the art that various modifications such as changes in design may be made based on their knowledge and the embodiments added with such modifications are also within the scope of the present invention.

EXPLANATION OF REFERENCE NUMERALS

10 Image display apparatus
12 Liquid crystal panel
12a Light shielding section
13 Front cover
14 Chassis
20 Backlight device
22 Light guide plate
22a End face
23 Dot-pattern
24 Rear plate
26 Heatsink
30 Base plate unit
32 Flexible substrate
34 LED unit
38 LED
40 Reflection sheet
42 Light mixing chamber
50 Package
50a Bottom
50b Inclined portion
60 First support member
62 Second support member
70 Lighting control system
72 LED drive control circuit
74 LED drive circuit
76 Temperature sensor
100 Backlight device
102 Light guide plate
102a End face

INDUSTRIAL APPLICABILITY

The present invention is usable for a backlight device and particularly usable for a backlight device that irradiates light from a rear surface of an image display panel.

The invention claimed is:

1. A backlight device, comprising:
a light guide plate; and
a plurality of light source units placed in a direction extending along an end face of the light guide plate,
wherein each of the plurality of light source units includes:
a plurality of white light-emitting diodes; and
a package section on which the plurality of white light-emitting diodes are fixed, and
wherein an interval between the end face of the light guide plate and the light source units is greater than an interval between the white light-emitting diodes fixed on the package section and smaller than an interval between the light source units.

2. The backlight device according to claim 1, wherein the package section has an inclined portion.

3. The backlight device according to claim 2, wherein the inclined portion reflect white light radiated from the plurality of white light-emitting diodes.

4. The backlight device according to claim 2, the height of the inclined portion is greater than that of the white light-emitting diodes.

5. The backlight device according to claim 1, wherein each of the plurality of white light-emitting diodes is configured by stacking a phosphor layer exited by blue light on a light-emitting face of a semiconductor light-emitting element configured to emit blue light.

6. The backlight device according to claim 1, wherein the light source units have a protection element for protecting from excess voltage.

7. The backlight device according to claim 1, wherein the plurality of white light-emitting diodes are fixed on the package section so as to be placed in the direction extending along the end face of the light guide plate.

8. The backlight device according to claim 1, wherein an interval between the light source units is in a range of 5 mm to 15 mm.

9. The backlight device according to claim 1, wherein an interval between the white light-emitting diodes fixed on the package section is in a range of 0.1 mm to 3 mm.

10. The backlight device according to claim 1, wherein an interval between the end face of the light guide plate and the light source units is in a range of 1 mm to 7 mm.

11. The backlight device according to claim 1, wherein a thickness of the light guide plate is in a range of 1 mm to 5 mm.

12. The backlight device according to claim 1, further comprising:
   a heat radiation unit configured to radiate heat generated in the plurality of white light-emitting diodes, the heat radiation unit being provided opposite to the light guide plate with respect to the plurality of white light-emitting diodes.

13. An image display apparatus comprising:
a light guide plate;
a plurality of light source units placed in a direction extending along an end face of the light guide plate; and
a liquid crystal panel configured to display an image,
wherein each of the plurality of light source units includes:
a plurality of white light-emitting diodes; and
a package section on which the plurality of white light-emitting diodes are fixed, and
wherein an interval between the end face of the light guide plate and the light source units is greater than an interval between the white light-emitting diodes fixed on the package section and smaller than an interval between the light source units.

* * * * *